United States Patent [19]

Fink

[11] 4,120,077
[45] Oct. 17, 1978

[54] TIE-DOWN TENSIONING DEVICE

[75] Inventor: William F. Fink, Novato, Calif.

[73] Assignee: Roberton & Schwartz, San Francisco, Calif.

[21] Appl. No.: 795,298

[22] Filed: May 9, 1977

[51] Int. Cl.² .................................. F16G 11/04
[52] U.S. Cl. .................................. 24/130; 403/269
[58] Field of Search ............. 24/130, 129 R; 403/269

[56] References Cited

U.S. PATENT DOCUMENTS

| 322,501 | 7/1885 | Taylor | 24/130 |
|---|---|---|---|
| 774,900 | 11/1904 | Wilson | 24/130 |
| 1,781,573 | 11/1930 | Errett | 24/129 R |
| 2,136,014 | 11/1938 | McDonald | 24/130 |
| 2,345,890 | 4/1944 | Daniels | 24/129 R |
| 2,449,235 | 9/1948 | Krupp | 24/130 |
| 2,450,358 | 9/1948 | Romano | 24/130 |
| 2,745,158 | 5/1956 | Schweigert | 24/130 |
| 3,343,809 | 9/1967 | Newell | 24/130 |
| 3,574,900 | 4/1971 | Emery | 24/130 |
| 3,898,760 | 8/1975 | Klein | 24/129 R |

FOREIGN PATENT DOCUMENTS

| 2,350,495 | 4/1975 | Fed. Rep. of Germany | 24/130 |
|---|---|---|---|
| 520 of | 1886 | United Kingdom | 24/130 |
| 1,010,686 | 11/1965 | United Kingdom | 24/130 |

*Primary Examiner*—Bernard A. Gelak

*Attorney, Agent, or Firm*—Phillips, Moore, Weissenberger, Lempio & Majestic

[57] ABSTRACT

A device for use in tensioning the lines, ropes or cables used to tie down cargo during transport aboard a ship or other means of transportation is disclosed. An embodiment of the device is described which comprises a rigid body defining an open ended, open top channel tapering from minimum transverse dimensions at the bottom to larger transverse dimensions at the open top thereof wth a hook rigidly fixed to the body at one end of the channel, a bracket rigidly fixed to the body at the other end of the channel and an opening through the body at one end of the channel having cross-sectional dimensions larger than the minimum transverse dimensions of the channel. The provisions of a plurality of elongated ridges on each of the sides of the channel is disclosed which ridges extend from the bottom of the channel to the top thereof with the bottom end of each ridge spaced a lesser distance along the channel from the opening than the top end thereof. The use of the device by attaching one end of a rope to the bracket, attaching the hook to a cleat, looping the rope for attachment to the cargo, passing the free end of the rope through the hole, tensioning the rope and subjecting a portion of the free end thereof to wedging action in the channel to fix the rope under tension is described.

8 Claims, 5 Drawing Figures

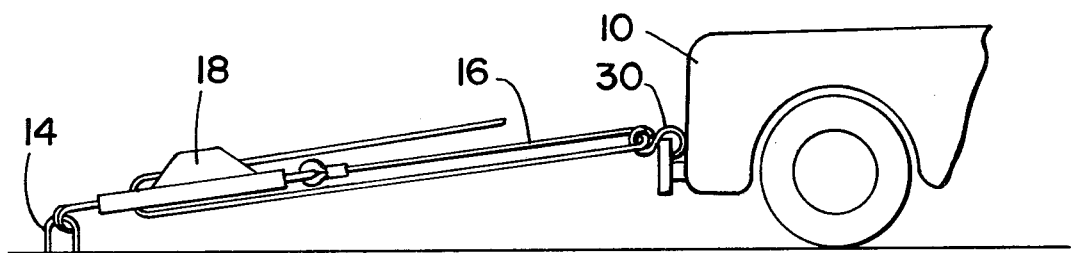
FIG_1
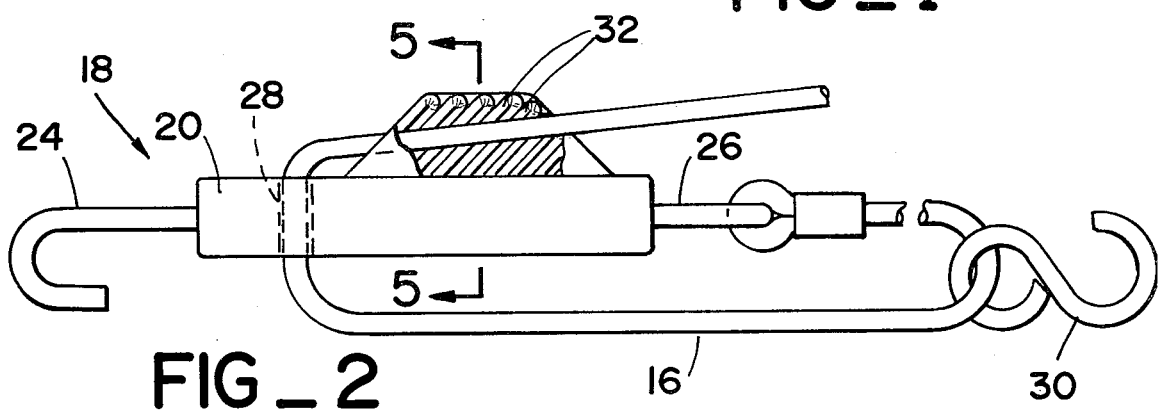
FIG_2
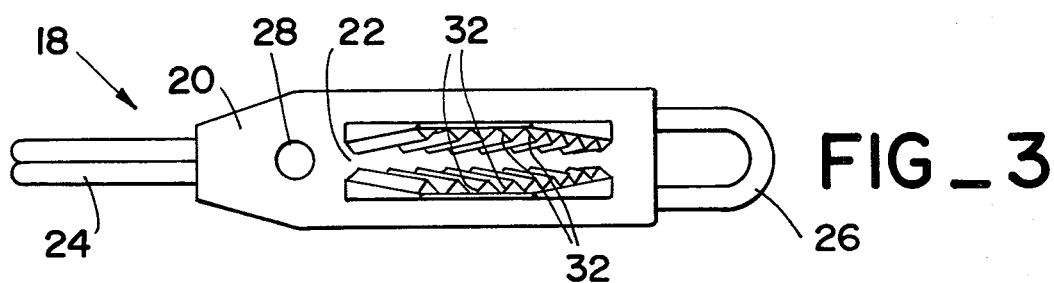
FIG_3
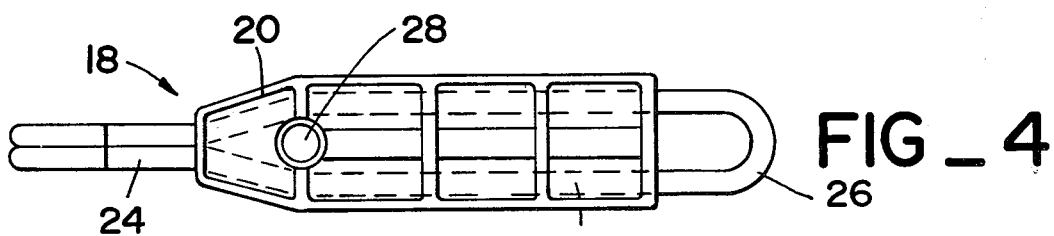
FIG_4
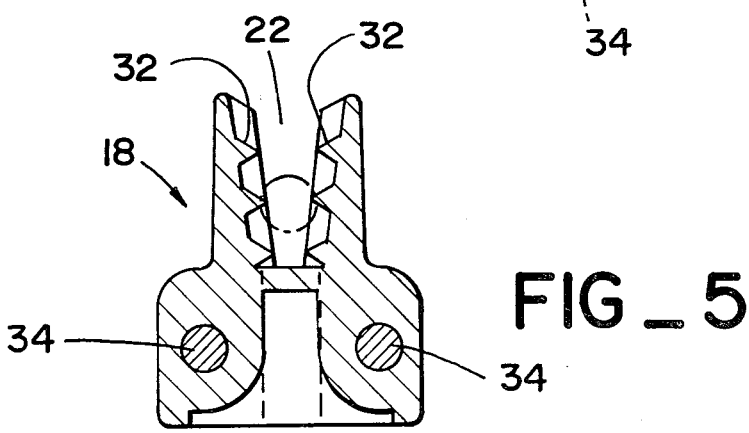
FIG_5

TIE-DOWN TENSIONING DEVICE

BACKGROUND OF THE INVENTION

This invention relates to the tensioning of lines, ropes or cables used to tie down cargo during transport by ship or other means of transportation and more particularly to an improved, simple and inexpensive device for enabling the tie-down lines, ropes or cables to be quickly and easily attached, tensioned, and reliably fixed in place under tension, while also enabling them to be quickly and easily released for removal of the cargo.

A variety of devices for tie-down tensioning are known in the art. However, such devices have been subject to one or more disadvantages in use. Thus, some of the devices of the prior art have made it difficult to adjust the length of the tie-down to size prior to tensioning. Others have been complicated and expensive to manufacture. Most have either been difficult to release for removal of the cargo or unstable and unreliable under tension during transport.

It is the primary object of this invention to provide a simple and inexpensive device for reliable tie-down tensioning which device enables the tie-down to be quickly and easily applied and tensioned and just as quickly and easily removed.

SUMMARY OF THE INVENTION

Briefly, a tie-down tensioning device according to this invention comprises a rigid body defining an elongated open ended, open top channel tapering from given transverse dimensions at the bottom thereof to larger transverse dimensions at the open top thereof. The body has attachment means rigidly fixed thereto at the opposite ends of the channel and an opening extends through the body at one end of the channel. The opening has cross-sectional dimensions larger than the minimum transverse dimensions of the channel at the bottom thereof. Each of the sides of the channel are provided with a plurality of elongated ridges extending from the bottom of the channel to the top of the channel with the bottom end of each ridge being spaced a lesser distance along the channel from the opening than the top end thereof.

BRIEF DESCRIPTION OF THE DRAWING

The foregoing objects and features of this invention will be more clearly understood from a reading of the following detailed description of a preferred embodiment in conjunction with the attached drawing thereof wherein:

FIG. 1 is a side view in elevation of a tie-down tensioning device in accordance with this invention in actual use.

FIG. 2 is an enlarged side view in elevation of a preferred embodiment of this invention with a portion broken away to show internal structure thereof and with a tie-down rope and hook shown as attached thereto.

FIG. 3 is a reduced top plan view of the embodiment of the tie-down tensioning device according to this invention as shown in FIG. 2.

FIG. 4 is a bottom view of FIG. 3.

FIG. 5 is a cross-sectional view taken along lines 5—5 of FIG. 2.

DETAILED DESCRIPTION OF PREFERRED EMBODIMENT

In transporting cargo aboard a ship or other means of transport such as a railroad car, truck or airplane, it is necessary to tie the cargo down to the supporting surface upon which it rests in order to avoid shifting of the cargo due to forces resulting from the movement of the transport means. This done by attaching a plurality of lines, ropes or cables between the cargo and appropriate cleats, brackets or other attachment means rigidly fixed to the supporting surface of the transport means. The tie-down line, ropes or cables are tensioned to rigidly fix the cargo with respect to the supporting surface upon which it rests and thus prevent the cargo from shifting in position due to forces exerted thereon during starting, stopping or other movement of the transport means.

Thus, referring to FIG. 1, a fragmentary representation of cargo in the form of a wheeled vehicle 10 is shown, supported on a surface 12 which may be, for example, a deck of a ship. A plurality of attachment brackets or cleats, only one 14 of which is shown in FIG. 1, are rigidly fixed to the supporting surface 12 at and about the location of the cargo 10. As shown in FIG. 1, the cargo 10 is tied down to the surface 12 by means of a plurality of lines, ropes or cables, only one 16 of which is shown in FIG. 1, each extending between a bracket 14 and the cargo and securely attached thereto. By placing the tie-down lines, ropes or cables 16 under tension, the forces to which the cargo 10 is subjected during transport may be distributed among the plurality of tie-down means and to this end a tie-down tensioning device 18 is used in attaching the tie-down line, ropes or cables 16 between the cargo 10 and the cleats 14.

Since the cleats 14 are permanently affixed to the surface 12 and the size and shape of the cargo 10 may vary, it will be appreciated that the length of line, rope or cable 16 required to attach the cargo 10 to different ones of the cleats 14 will vary. Since a plurality of tie-down lines, ropes or cables 16 are required for each unit of cargo 10 and since each must be individually adjusted in length, a substantial amount of time and labor is required to reliably tie-down a unit of cargo 10. A separate tensioning device 18 must, of course, be provided for each line, rope or cable 16 and it is therefore highly desirable that the tensioning device be simple and inexpensive. In addition, it is highly desirable that the tie-down tensioning device be adapted for quick and easy use both in tying down the cargo 10 and in releasing the cargo 10 for removal while at the same time providing a high degree of reliability in fixing the line, rope or cable 16 under tension while the cargo is in transit.

A preferred embodiment of the tie-down tensioning device according to this invention is shown in FIGS. 2 through 5. Broadly, a tie-down tensioning device according to this invention comprises a rigid body 20 defining an open ended, open top channel 22 as best shown in FIGS. 3 and 5. The rigid body 20 is provided with a hook 24 at one end of the channel 22 and with a bracket 26 at the other end of the channel 22. As shown in FIG. 2, a tie-down line, rope or cable 16 is attached to the bracket 26 and the hook 24 may be adapted for attachment to the cargo or to a cleat in the supporting surface for the cargo as appropriate.

The line, rope or cable 16 is looped back on itself and the free end thereof is passed through an opening such as the hole 28 adjacent one end of the channel 22. The line, rope or cable 16 may be passed through a cleat 14 or about an appropriate attachment means on the unit of cargo 10 prior to passing it through the opening or hole 28 in the body 20. Alternatively, the line, rope or cable 16 may be threaded through an appropriate hook means 30, as shown in FIGS. 1 and 2, prior to passing it through the opening 28 in the body 20.

The line, rope or cable 16 must, of course, have sufficient length to provide a substantial portion at the free end thereof after passing it through the opening 28 in the body 20. According to this invention, the tie-down line, rope or cable 16 is manually tensioned by pulling on the free end portion thereof, which is then wedged in the channel 22 to maintain the tension. Thus, according to this invention, channel 22 tapers from dimensions smaller than the cross-sectional dimensions of the line, rope or cable 16 at the bottom thereof to dimensions larger than the cross-sectional dimensions of the line, rope or cable 16 at the top thereof as best shown in FIG. 5. In addition, the sides of the channel 22 are each provided with a plurality of ridges 32 extending from the bottom of the channel 22 to the open top thereof by grooving the sides of the channel 22 as best shown in FIGS. 2 and 5. As shown in FIG. 2, the ends of the ridges 32 at the bottom of the channel 22 are spaced a lesser distance from the opening 28 than are the ends of the ridges 32 at the open top of the channel 22. Thus, the ridges 32 aid in providing and maintaining the wedging action of the channel 22 when the line, rope of cable 16 is received therein under tension. As best shown in FIGS. 3 and 5, the ridges 32 are preferably triangular in cross-sectional configuration thus tending to grip and guide the line, rope or cable 16 toward the bottom of the channel 22.

According to the preferred embodiment of this invention, a single unitary carbon steel rod 30 is bent to an appropriate configuration to provide the hook 24 and bracket 26 at opposite ends of the rigid body 20. The pre-formed carbon steel rod 34 is then embedded in the rigid body 20 by casting the rigid body 20 about the rod. As best shown in FIG. 4, the rod 34 is formed into an open, generally U-shape planar figure to provide the bracket 26. The free ends of the legs of the U-shaped figure are then brought together and bent to form identical twin hooks 24.

In the preferred embodiment of this invention, the rigid body 20 is cast of a polycarbonate plastic preferably of the type sold under the trade name "Lexan" which is extremely strong and durable. As best shown in FIGS. 4 and 5, the rigid body 20 may be cast in webbed form in order to conserve materials. The dimensions of the tie-down tensioning device 18 according to this invention, are of course selected to provide adequate strength for the desired use. In an actual embodiment of this invention, a 5/16 inch (8 mm) diameter carbon steel rod about 2 ft. (60 cm) long was bent to form a closed figure about 10 inches (30 cm) in length, providing a 1 inch (2.5 cm) bracket 26 at one end and a pair of 1 inch (2.5 cm) hooks 24 at the other end. The rigid body was about 6 inches (15 cm) in length and 1¾ inches (4.5 cm) in width. The channel 22 has a depth of about 1⅛ inch (3 cm) with a length of 3½ inches (9 cm) at the bottom and 1½ inches (3.5 cm) at the top. A ⅜ inch (1 cm) nylon rope is attached to the bracket 26 and the opening 28 is dimensioned to receive the nylon rope 16 with a free sliding fit. The sides of the channel 22 taper from a minimum transverse dimension of about ¼ inch (6 mm) at the bottom thereof to a spacing of about ½ inch (1.25 cm) at the open top. Triangular ridges having a cross-sectional altitude of about ⅛ inch (0.5 cm) along their entire length are provided by grooves in the sides of the channel 22. According to the preferred embodiment of this invention, the ridges are rectilinear and extend away from the opening 28 at an included angle of about 60° with respect to the bottom of the channel 22.

Obvious modifications may be made in the preferred embodiment, as shown in the drawing and specifically described hereinabove, without departing from the teaching of this invention. For example, the opening 28 may be located at either end of the channel 22. However, the ridges 32 must extend at an angle away from the opening 28, or, in other words, the bottom end of the ridges 32 must be spaced a lesser distance along the channel 22 from the opening 28 than the top ends of the ridges 32. The ridges need not be rectilinear but could be curved along their length. The ridges 32 may be configured and spaced to aid in the wedging action provided by the channel 22. For example, in the preferred embodiment described above, the nylon rope was made of three twisted strands, each having a diameter of about 3/16 inch (0.4 cm) and the triangular ridges 32 are configured and spaced to receive the individual strands of the rope therebetween, thereby insuring that the rope will be firmly gripped and wedged in channel 22.

What is claimed is:

1. A tie-down tensioning device comprising a rigid body of cast polycarbonate plastic defining an elongated open-ended, open top channel, said channel tapering from minimum transverse dimensions at the bottom thereof to larger transverse dimensions at the open top thereof, said body having a metallic rod formed into a generally U-shape planar figure rigidly fixed thereto and projecting therefrom to provide attachment means at the opposite ends of said channel with the bottom of said U-shape projecting from said body at one end of said channel and the free ends of the legs thereof projecting from said body at the other end of said channel and being formed to provide a hook means, and an opening through said body at one end of said channel having cross-sectional dimensions larger than said minimum transverse dimensions of said channel at the bottom thereof, the sides of said channel each being grooved to provide a plurality of elongated ridges extending from the bottom of said channel to the top of said channel inclined away from said opening.

2. A tie-down tensioning device as claimed in claim 1 wherein said elongated channel and said generally planar U-shape figure lie in planes which are substantially perpendicular to each other.

3. A tie-down tensioning device as claimed in claim 2 wherein said metallic rod is made of high carbon steel and said free ends of said legs of said generally U-shape planar figure formed thereby are formed to provide a pair of identical contiguous hook shapes.

4. A tie-down tensioning device as claimed in claim 1 wherein said plurality of elongated ridges are each generally triangular in cross-section.

5. A tie-down tensioning device as claimed in claim 4 wherein said plurality of ridges extend at an included angle of about 60° with respect to the bottom of said channel.

6. A tie-down tension device as claimed in claim 1 wherein said opening through said body is a generally circular hole at said other end of said channel adjacent said hook means.

7. In combination a tie-down comprising a length of nylon rope of given diameter made of a plurality of twisted strands and a tie-down tensioning device comprising a steel rod formed into a generally U-shape planar figure with the free ends of the legs thereof bent inwardly of said U-shape and extending contiguously with each other in identical hook shapes, and a rigid body of polycarbonate plastic cast about and embedding a substantial portion of said U-shape planar figure between said bottom thereof and said hook shape portion of said free ends of said legs thereof, said rigid body defining an elongated open-ended, open top channel tapering from minimum transverse dimensions at the bottom thereof smaller than said given diameter of said rope to minimum transverse dimensions at the open top thereof larger than said given diameter of said rope and said body having a hole therethrough of larger cross-sectional dimensions than said rope at one end of said channel, the sides of said channel being grooved to provide a plurality of elongated ridges extending from the bottom of said channel to the top of said channel with the bottom end of each of said plurality of ridges being spaced a lesser distance along the axis of elongation of said channel from said hole than the top end thereof, said rope having one end fixedly attached to said bottom of said generally U-shape figure whereby the free end of said rope may be passed through said hole in the direction from the bottom of said channel toward the top thereof and a length of said rope at the free end thereof received in said channel along the axis of elongation thereof with a wedging fit.

8. A tie-down tensioning device comprising a rigid body defining an elongated open-ended, open top channel, said channel tapering from minimum transverse dimensions at the bottom thereof to larger transverse dimensions at the open top thereof, said body having a metallic rod formed into a generally U-shape planar figure rigidly fixed thereto and projecting therefrom to provide attachment means at the opposite ends of said channel with the bottom of said U-shape projecting from said body at one end of said channel and the free ends of the legs thereof projecting from said body at the other end of said channel and being formed to provide a hook means, an opening through said body at one end of said channel, said opening having cross-sectional dimensions larger than said minimum transverse dimensions of said channel at the bottom thereof, and the sides of said channel each being grooved to provide a plurality of elongated ridges extending from the bottom of said channel to the top of said channel inclined away from said opening.

* * * * *